US007916190B1

(12) United States Patent
DeLuca (10) Patent No.: US 7,916,190 B1
(45) Date of Patent: Mar. 29, 2011

(54) RED-EYE FILTER METHOD AND APPARATUS

(75) Inventor: Michael J. DeLuca, Boca Raton, FL (US)

(73) Assignee: Tessera Technologies Ireland Limited, Galway (IE)

( * ) Notice: Subject to any disclaimer, the term of this patent is extended or adjusted under 35 U.S.C. 154(b) by 0 days.

(21) Appl. No.: 12/611,387

(22) Filed: Nov. 3, 2009

Related U.S. Application Data

(63) Continuation of application No. 11/379,346, filed on Apr. 19, 2006, now Pat. No. 7,619,665, which is a continuation of application No. 10/170,511, filed on Jun. 12, 2002, now Pat. No. 7,042,505, which is a continuation of application No. 08/947,603, filed on Oct. 9, 1997, now Pat. No. 6,407,777.

(51) Int. Cl.
*H04N 5/217* (2006.01)
*H04N 5/228* (2006.01)

(52) U.S. Cl. ..................... 348/241; 348/222.1

(58) Field of Classification Search ............... 348/227.1, 348/229.1, 370–371; 382/117; 396/158, 396/166

See application file for complete search history.

(56) References Cited

U.S. PATENT DOCUMENTS

| | | | | |
|---|---|---|---|---|
| 4,285,588 A | * | 8/1981 | Mir | ................................ 396/158 |
| 4,577,219 A | | 3/1986 | Klie et al. | |
| 4,646,134 A | | 2/1987 | Komatsu et al. | |
| 4,777,620 A | | 10/1988 | Shimoni et al. | |
| 4,881,067 A | | 11/1989 | Watanabe et al. | |
| 4,978,989 A | | 12/1990 | Nakano et al. | |
| 5,016,107 A | * | 5/1991 | Sasson et al. | ............... 348/231.1 |
| 5,070,355 A | * | 12/1991 | Inoue et al. | .................... 396/166 |
| 5,130,789 A | * | 7/1992 | Dobbs et al. | .................. 358/500 |
| 5,164,831 A | | 11/1992 | Kuchta et al. | |
| 5,164,833 A | | 11/1992 | Aoki | |
| 5,202,720 A | * | 4/1993 | Fujino et al. | .................. 396/158 |
| 5,227,837 A | | 7/1993 | Terashita | |
| 5,231,674 A | | 7/1993 | Cleveland et al. | |
| 5,249,053 A | | 9/1993 | Jain | |
| 5,274,457 A | | 12/1993 | Kobayashi et al. | |
| 5,301,026 A | | 4/1994 | Lee | |

(Continued)

FOREIGN PATENT DOCUMENTS

EP           884694 A1   12/1998

(Continued)

OTHER PUBLICATIONS

Final Office Action mailed Apr. 26, 2010, for U.S. Appl. No. 10/773,092, filed Feb. 4, 2004.

(Continued)

*Primary Examiner* — Kelly L Jerabek
(74) *Attorney, Agent, or Firm* — Andrew V. Smith (57) ABSTRACT

A digital camera has an integral flash and stores and displays a digital image. Under certain conditions, a flash photograph taken with the camera may result in a red-eye phenomenon due to a reflection within an eye of a subject of the photograph. The digital camera has a red-eye filter which analyzes the stored image for the red-eye phenomenon and modifies the stored image to eliminate the red-eye phenomenon by changing the red area to black. The modification of the image is enabled when a photograph is taken under conditions indicative of the red-eye phenomenon. The modification is subject to anti-falsing analysis which further examines the area around the red-eye area for indicia of the eye of the subject.

20 Claims, 5 Drawing Sheets

U.S. PATENT DOCUMENTS

| | | | |
|---|---|---|---|
| 5,303,049 A | 4/1994 | Ejima et al. | |
| 5,335,072 A | 8/1994 | Tanaka et al. | |
| 5,384,601 A | 1/1995 | Yamashita et al. | |
| 5,400,113 A | 3/1995 | Sosa et al. | |
| 5,424,794 A | 6/1995 | McKay | |
| 5,432,863 A * | 7/1995 | Benati et al. | 382/167 |
| 5,432,866 A | 7/1995 | Sakamoto | |
| 5,438,367 A | 8/1995 | Yamamoto et al. | |
| 5,452,048 A * | 9/1995 | Edgar | 396/180 |
| 5,455,606 A | 10/1995 | Keeling et al. | |
| 5,537,516 A * | 7/1996 | Sherman et al. | 358/1.9 |
| 5,568,187 A | 10/1996 | Okino | |
| 5,568,194 A | 10/1996 | Abe | |
| 5,649,238 A | 7/1997 | Wakabayashi et al. | |
| 5,671,013 A | 9/1997 | Nakao | |
| 5,678,073 A | 10/1997 | Stephenson, III et al. | |
| 5,694,926 A | 12/1997 | DeVries et al. | |
| 5,708,866 A | 1/1998 | Leonard | |
| 5,719,639 A | 2/1998 | Imamura | |
| 5,719,951 A | 2/1998 | Shackleton et al. | |
| 5,721,983 A | 2/1998 | Furutsu | |
| 5,724,456 A | 3/1998 | Boyack et al. | |
| 5,734,425 A | 3/1998 | Takizawa et al. | |
| 5,748,764 A * | 5/1998 | Benati et al. | 382/117 |
| 5,748,784 A | 5/1998 | Sugiyama | |
| 5,751,836 A * | 5/1998 | Wildes et al. | 382/117 |
| 5,761,550 A * | 6/1998 | Kancigor | 396/176 |
| 5,781,650 A * | 7/1998 | Lobo et al. | 382/118 |
| 5,805,720 A | 9/1998 | Suenaga et al. | |
| 5,805,727 A | 9/1998 | Nakano | |
| 5,805,745 A * | 9/1998 | Graf | 382/291 |
| 5,815,749 A | 9/1998 | Tsukahara et al. | |
| 5,818,975 A | 10/1998 | Goodwin et al. | |
| 5,847,714 A | 12/1998 | Naqvi et al. | |
| 5,850,470 A | 12/1998 | Kung et al. | |
| 5,862,217 A * | 1/1999 | Steinberg et al. | 713/176 |
| 5,862,218 A * | 1/1999 | Steinberg | 713/176 |
| 5,892,837 A | 4/1999 | Luo et al. | |
| 5,949,904 A | 9/1999 | Delp | |
| 5,974,189 A | 10/1999 | Nicponski | |
| 5,990,973 A * | 11/1999 | Sakamoto | 348/576 |
| 5,991,456 A | 11/1999 | Rahman et al. | |
| 5,991,549 A * | 11/1999 | Tsuchida | 396/158 |
| 5,991,594 A | 11/1999 | Froeber et al. | |
| 5,999,160 A | 12/1999 | Kitamura et al. | |
| 6,006,039 A | 12/1999 | Steinberg et al. | |
| 6,009,209 A | 12/1999 | Acker et al. | |
| 6,011,547 A | 1/2000 | Shiota et al. | |
| 6,016,354 A | 1/2000 | Lin et al. | |
| 6,028,611 A | 2/2000 | Anderson et al. | |
| 6,035,072 A | 3/2000 | Read | |
| 6,035,074 A | 3/2000 | Fujimoto et al. | |
| 6,036,072 A | 3/2000 | Lee | |
| 6,101,271 A | 8/2000 | Yamashita et al. | |
| 6,104,839 A | 8/2000 | Cok et al. | |
| 6,118,485 A | 9/2000 | Hinoue et al. | |
| 6,134,339 A | 10/2000 | Luo | |
| 6,151,403 A | 11/2000 | Luo | |
| 6,172,706 B1 | 1/2001 | Tatsumi | |
| 6,192,149 B1 | 2/2001 | Eschbach et al. | |
| 6,195,127 B1 | 2/2001 | Sugimoto | |
| 6,201,571 B1 | 3/2001 | Ota | |
| 6,204,858 B1 | 3/2001 | Gupta | |
| 6,204,868 B1 | 3/2001 | Yamauchi et al. | |
| 6,233,364 B1 | 5/2001 | Krainiouk et al. | |
| 6,249,315 B1 | 6/2001 | Holm | |
| 6,252,976 B1 | 6/2001 | Schildkraut et al. | |
| 6,266,054 B1 | 7/2001 | Lawton et al. | |
| 6,268,939 B1 | 7/2001 | Klassen et al. | |
| 6,275,614 B1 | 8/2001 | Krishnamurthy et al. | |
| 6,278,491 B1 | 8/2001 | Wang et al. | |
| 6,285,410 B1 | 9/2001 | Marni | |
| 6,292,574 B1 | 9/2001 | Schildkraut et al. | |
| 6,295,378 B1 | 9/2001 | Kitakado et al. | |
| 6,298,166 B1 | 10/2001 | Ratnakar et al. | |
| 6,300,935 B1 | 10/2001 | Sobel et al. | |
| 6,381,345 B1 | 4/2002 | Swain | |
| 6,393,148 B1 | 5/2002 | Bhaskar | |
| 6,396,963 B2 | 5/2002 | Shaffer et al. | |
| 6,407,777 B1 * | 6/2002 | DeLuca | 348/576 |
| 6,421,468 B1 | 7/2002 | Ratnakar et al. | |
| 6,426,775 B1 | 7/2002 | Kurokawa | |
| 6,429,924 B1 | 8/2002 | Milch | |
| 6,433,818 B1 | 8/2002 | Steinberg et al. | |
| 6,438,264 B1 | 8/2002 | Gallagher et al. | |
| 6,441,854 B2 | 8/2002 | Fellegara et al. | |
| 6,459,436 B1 | 10/2002 | Kumada et al. | |
| 6,473,199 B1 | 10/2002 | Gilman et al. | |
| 6,496,655 B1 | 12/2002 | Malloy Desormeaux | |
| 6,501,911 B1 | 12/2002 | Malloy Desormeaux | |
| 6,505,003 B1 | 1/2003 | Malloy Desormeaux | |
| 6,510,520 B1 | 1/2003 | Steinberg | |
| 6,516,154 B1 | 2/2003 | Parulski et al. | |
| 6,614,471 B1 | 9/2003 | Ott | |
| 6,614,995 B2 | 9/2003 | Tseng | |
| 6,621,867 B1 | 9/2003 | Sazzad et al. | |
| 6,628,833 B1 | 9/2003 | Horie | |
| 6,700,614 B1 | 3/2004 | Hata | |
| 6,707,950 B1 | 3/2004 | Burns et al. | |
| 6,714,665 B1 | 3/2004 | Hanna et al. | |
| 6,718,051 B1 | 4/2004 | Eschbach | |
| 6,724,941 B1 | 4/2004 | Aoyama | |
| 6,728,401 B1 | 4/2004 | Hardeberg | |
| 6,765,686 B2 | 7/2004 | Maruoka | |
| 6,786,655 B2 | 9/2004 | Cook et al. | |
| 6,792,161 B1 | 9/2004 | Imaizumi et al. | |
| 6,798,913 B2 | 9/2004 | Toriyama | |
| 6,859,565 B2 | 2/2005 | Baron | |
| 6,873,743 B2 | 3/2005 | Steinberg | |
| 6,885,766 B2 | 4/2005 | Held et al. | |
| 6,895,112 B2 | 5/2005 | Chen et al. | |
| 6,900,882 B2 | 5/2005 | Iida | |
| 6,912,298 B1 | 6/2005 | Wilensky | |
| 6,937,997 B1 | 8/2005 | Parulski | |
| 6,967,680 B1 | 11/2005 | Kagle et al. | |
| 6,980,691 B2 | 12/2005 | Nesterov et al. | |
| 6,984,039 B2 | 1/2006 | Agostinelli | |
| 7,024,051 B2 | 4/2006 | Miller et al. | |
| 7,027,662 B2 | 4/2006 | Baron | |
| 7,030,927 B2 | 4/2006 | Sasaki | |
| 7,035,461 B2 | 4/2006 | Luo et al. | |
| 7,035,462 B2 | 4/2006 | White et al. | |
| 7,042,501 B1 | 5/2006 | Matama | |
| 7,042,505 B1 * | 5/2006 | DeLuca | 348/241 |
| 7,062,086 B2 | 6/2006 | Chen et al. | |
| 7,116,820 B2 | 10/2006 | Luo et al. | |
| 7,133,070 B2 | 11/2006 | Wheeler et al. | |
| 7,155,058 B2 | 12/2006 | Gaubatz et al. | |
| 7,171,044 B2 | 1/2007 | Chen et al. | |
| 7,216,289 B2 | 5/2007 | Kagle et al. | |
| 7,224,850 B2 | 5/2007 | Zhang et al. | |
| 7,289,664 B2 | 10/2007 | Enomoto | |
| 7,295,233 B2 | 11/2007 | Steinberg et al. | |
| 7,310,443 B1 | 12/2007 | Kris et al. | |
| 7,315,631 B1 | 1/2008 | Corcoran et al. | |
| 7,336,821 B2 | 2/2008 | Ciuc et al. | |
| 7,352,394 B1 * | 4/2008 | DeLuca et al. | 348/241 |
| 7,362,368 B2 | 4/2008 | Steinberg et al. | |
| 7,369,712 B2 | 5/2008 | Steinberg et al. | |
| 7,403,643 B2 | 7/2008 | Ianculescu et al. | |
| 7,436,998 B2 | 10/2008 | Steinberg et al. | |
| 7,454,040 B2 | 11/2008 | Luo et al. | |
| 7,515,740 B2 | 4/2009 | Corcoran et al. | |
| 7,619,665 B1 * | 11/2009 | DeLuca | 348/241 |
| 7,738,015 B2 | 6/2010 | Steinberg et al. | |
| 2001/0031142 A1 | 10/2001 | Whiteside | |
| 2001/0052937 A1 | 12/2001 | Suzuki | |
| 2002/0019859 A1 | 2/2002 | Watanabe | |
| 2002/0041329 A1 | 4/2002 | Steinberg | |
| 2002/0051571 A1 | 5/2002 | Jackway et al. | |
| 2002/0054224 A1 | 5/2002 | Wasula et al. | |
| 2002/0085088 A1 | 7/2002 | Eubanks | |
| 2002/0090133 A1 | 7/2002 | Kim et al. | |
| 2002/0093577 A1 | 7/2002 | Kitawaki et al. | |
| 2002/0105662 A1 | 8/2002 | Patton et al. | |
| 2002/0114513 A1 | 8/2002 | Hirao | |
| 2002/0131770 A1 | 9/2002 | Meier et al. | |

| | | |
|---|---|---|
| 2002/0141661 A1 | 10/2002 | Steinberg |
| 2002/0150292 A1 | 10/2002 | O'callaghan |
| 2002/0159630 A1 | 10/2002 | Buzuloiu et al. |
| 2002/0172419 A1 | 11/2002 | Lin et al. |
| 2003/0021478 A1 | 1/2003 | Yoshida |
| 2003/0025808 A1 | 2/2003 | Parulski et al. |
| 2003/0025811 A1 | 2/2003 | Keelan et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0107649 A1 | 6/2003 | Flickner et al. |
| 2003/0113035 A1 | 6/2003 | Cahill et al. |
| 2003/0118216 A1 | 6/2003 | Goldberg |
| 2003/0137597 A1 | 7/2003 | Sakamoto et al. |
| 2003/0161506 A1 | 8/2003 | Velazquez et al. |
| 2003/0190072 A1 | 10/2003 | Adkins et al. |
| 2003/0194143 A1 | 10/2003 | Iida |
| 2003/0202715 A1 | 10/2003 | Kinjo |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0041924 A1 | 3/2004 | White et al. |
| 2004/0046878 A1 | 3/2004 | Jarman |
| 2004/0047491 A1 | 3/2004 | Rydbeck |
| 2004/0056975 A1 | 3/2004 | Hata |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0090461 A1 | 5/2004 | Adams |
| 2004/0093432 A1 | 5/2004 | Luo et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114904 A1 | 6/2004 | Sun et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0223063 A1 | 11/2004 | DeLuca et al. |
| 2004/0227978 A1 | 11/2004 | Enomoto |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1 | 2/2005 | Steinberg et al. |
| 2005/0046730 A1 | 3/2005 | Li |
| 2005/0047655 A1 | 3/2005 | Luo et al. |
| 2005/0058340 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0074164 A1 | 4/2005 | Yonaha |
| 2005/0074179 A1 | 4/2005 | Wilensky |
| 2005/0078191 A1 | 4/2005 | Battles |
| 2005/0129331 A1 | 6/2005 | Kakiuchi et al. |
| 2005/0134719 A1 | 6/2005 | Beck |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238230 A1 | 10/2005 | Yoshida |
| 2005/0243348 A1 | 11/2005 | Yonaha |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |
| 2006/0039690 A1 | 2/2006 | Steinberg et al. |
| 2006/0045352 A1 | 3/2006 | Gallagher |
| 2006/0050300 A1 | 3/2006 | Mitani et al. |
| 2006/0066628 A1 | 3/2006 | Brodie et al. |
| 2006/0082847 A1 | 4/2006 | Sugimoto |
| 2006/0093212 A1 | 5/2006 | Steinberg et al. |
| 2006/0093238 A1 | 5/2006 | Steinberg et al. |
| 2006/0098867 A1 | 5/2006 | Gallagher |
| 2006/0098875 A1 | 5/2006 | Sugimoto |
| 2006/0119832 A1 | 6/2006 | Iida |
| 2006/0120599 A1 | 6/2006 | Steinberg et al. |
| 2006/0140455 A1 | 6/2006 | Costache et al. |
| 2006/0150089 A1 | 7/2006 | Jensen et al. |
| 2006/0204052 A1 | 9/2006 | Yokouchi |
| 2006/0204110 A1 | 9/2006 | Steinberg et al. |
| 2006/0221408 A1 | 10/2006 | Fukuda |
| 2006/0285754 A1 | 12/2006 | Steinberg et al. |
| 2007/0110305 A1 | 5/2007 | Corcoran et al. |
| 2007/0116379 A1 | 5/2007 | Corcoran et al. |
| 2007/0116380 A1 | 5/2007 | Ciuc et al. |
| 2007/0133863 A1 | 6/2007 | Sakai et al. |
| 2007/0154189 A1 | 7/2007 | Harradine et al. |
| 2007/0201724 A1 | 8/2007 | Steinberg et al. |
| 2007/0263104 A1 | 11/2007 | DeLuca et al. |
| 2007/0263928 A1 | 11/2007 | Akahori |
| 2008/0002060 A1 | 1/2008 | DeLuca et al. |
| 2008/0013798 A1 | 1/2008 | Ionita et al. |
| 2008/0043121 A1 | 2/2008 | Prilutsky et al. |
| 2008/0112599 A1 | 5/2008 | Nanu et al. |
| 2008/0144965 A1 | 6/2008 | Steinberg et al. |
| 2008/0186389 A1 | 8/2008 | DeLuca et al. |
| 2008/0211937 A1 | 9/2008 | Steinberg et al. |
| 2008/0232711 A1 | 9/2008 | Prilutsky et al. |
| 2008/0240555 A1 | 10/2008 | Nanu et al. |

FOREIGN PATENT DOCUMENTS

| | | |
|---|---|---|
| EP | 911759 A2 | 4/1999 |
| EP | 911759 A3 | 6/2000 |
| EP | 1199672 A2 | 4/2002 |
| EP | 1288858 A1 | 3/2003 |
| EP | 1288859 A1 | 3/2003 |
| EP | 1288860 A1 | 3/2003 |
| EP | 1293933 A1 | 3/2003 |
| EP | 1296510 A2 | 3/2003 |
| EP | 1429290 A2 | 6/2004 |
| EP | 1478169 A2 | 11/2004 |
| EP | 1429290 B1 | 7/2008 |
| JP | 4192681 A2 | 7/1992 |
| JP | 2000-134486 A2 | 5/2000 |
| JP | 2002-271808 A2 | 9/2002 |
| WO | WO0171421 | 9/2001 |
| WO | WO0245003 A1 | 6/2002 |
| WO | WO03026278 A1 | 3/2003 |
| WO | WO03071484 A1 | 8/2003 |
| WO | WO2005015896 A1 | 2/2005 |

| WO | WO2005041558 A1 | 5/2005 |
| WO | WO2005109853 A1 | 11/2005 |
| WO | WO2006018056 A1 | 2/2006 |

OTHER PUBLICATIONS

Final Office Action mailed Apr. 26, 2010, for U.S. Appl. No. 11/690,834, filed Mar. 25, 2007.
Final Office Action mailed Apr. 26, 2010, for U.S. Appl. No. 11/772,427, filed Feb. 2, 2007.
Final Office Action mailed Apr. 26, 2010, for U.S. Appl. No. 12/035,416, filed Feb. 21, 2008.
Final Office Action mailed Mar. 24, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Final Office Action mailed Sep. 1, 2009, for U.S. Appl. No. 11/841,855, filed Aug. 20, 2007.
Non-Final Office Action mailed Aug. 30, 2010, for U.S. Appl. No. 11/841,855, filed Aug. 20, 2007.
Non-Final Office Action mailed Aug. 31, 2009, for U.S. Appl. No. 11/462,035, filed Aug. 2, 2006.
Non-Final Office Action mailed Aug. 5, 2010, for U.S. Appl. No. 11/462,035, filed Aug. 2, 2006.
Non-Final Office Action mailed Jul. 14, 2009, for U.S. Appl. No. 12/192,897, filed Aug. 15, 2008.
Non-Final Office Action mailed Mar. 9, 2010, for U.S. Appl. No. 12/192,897, filed Aug. 15, 2008.
Non-Final Office Action mailed May 3, 2010, for U.S. Appl. No. 12/187,763, filed Aug. 7, 2008.
Non-Final Office Action mailed May 4, 2010, for U.S. Appl. No. 12/192,335, filed Aug. 15, 2008.
Non-Final Office Action mailed Oct. 5, 2009, for U.S. Appl. No. 10/919,226, filed Aug. 16, 2004.
Non-Final Office Action mailed Oct. 7, 2009, for U.S. Appl. No. 12/119,614, filed May 13, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug. 15, 2008.
Notice of Allowance mailed Nov. 18, 2009, for U.S. Appl. No. 11/282,954, filed Nov. 18, 2005.
Notice of Allowance mailed Oct. 15, 2010, for U.S. Appl. No. 11/554,539, filed Oct. 30, 2006.
Patent Abstracts of Japan, publication No. 2000050062, Image Input Device, application No. 10-217124, published Feb. 18, 2000, 1 page.
PCT International Search Report and Written Opinion of the International Searching Authority for PCT Application No. PCT/EP2005/005033, dated Aug. 4, 2006, 13 pages.
PCT Notification of Transmittal of the International Search Report and the Written Opinion of the International Searching Authority, or the Declaration for PCT/EP/2005/05907, dated Aug. 1, 2005, 12 pages.
Tan, Yap-peng et al., "Robust Sequential Approach for the Detection of Defective Pixels in an Image Sensor, IEEE International Conference on Acoustics, Speech, and Signal Processing, 1999, pp. 2239-2242, vol. 4. http:// ieeexplorejeee.org/search/freesrchabstract.jsp?arnumber=758382&isnumber= 16342& punumber=6110& k2dockey=758382@ ieeecnfs& query=%28%28%28%2 8images+and+ defects+and+correction% 29%29%29%29+%3Cin%3E".
Tatsutoshi Kitajima (JP04-192681 English Translation; Electronic Camera, Jul. 10, 1992).
Toet, A., "Multiscale Color Image Enhancement, Posted online: 200208-06 18:09:24.0 International Conference on Image Processing and its Applications, 1992, pp. 583-585. http://ieeexplore.ieee.org/ search/freesrchabstract.jsp?arnumber=146865& isnumber=3917&punumber=1197&k2dockey=146865@ieecnfs& query=%28%28images+and+defects+and+luminance%29%29+%3Cin%3E+metadata&pos=1".
Translation of Hiroshi et al. JP05-224271, Mar. 1993, Japan Publication.
United Kingdom Search Report dated May 22, 2007, issued in Application No. GB 0701957.3.
U.S. Appl. No. 10/170,511, filed Jun. 12, 2002, inventor Michael J. DeLuca.
U.S. Appl. No. 10/772,767, filed Feb. 4, 2004, by inventors Michael J. DeLuca, et al.
U.S. Appl. No. 11/217,788, filed Aug. 30, 2005, inventors Eran Steinberg, et al.
Willamowski, J. et al., "Probabilistic Automatic Red Eye Detection and Correction", The 18th International Conference on Pattern Recognition (ICPR'06), 2006, pp. 762-765, vol. 3, IEEE Computer Society.

* cited by examiner

RED-EYE FILTER METHOD AND APPARATUS

CROSS-REFERENCE TO RELATED APPLICATIONS

This application is a continuation of U.S. patent application Ser. No. 11/379,346, filed Apr. 19, 2006, now U.S. Pat. No. 7,619,665, which is a continuation of U.S. application Ser. No. 10/170,511, filed Jun. 12, 2002, now U.S. Pat. No. 7,042,505, which is a continuation application of U.S. application Ser. No. 08/947,603, filed Oct. 9, 1997, now U.S. Pat. No. 6,407,777. Each of these applications is hereby incorporated by reference.

FIELD OF THE INVENTION

The invention relates generally to the area of flash photography, and more specifically to filtering "red-eye" from a digital camera image.

BACKGROUND OF THE INVENTION

"Red-eye" is a phenomenon in flash photography where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

The red-eye phenomenon can be minimized by causing the iris to reduce the opening of the pupil. This is typically done with a "pre-flash", a flash or illumination of light shortly before a flash photograph is taken. This causes the iris to close. Unfortunately, the pre-flash is an objectionable 0.2 to 0.6 seconds prior to the flash photograph. This delay is readily discernible and easily within the reaction time of a human subject. Consequently the subject may believe the pre-flash is the actual photograph and be in a less than desirable position at the time of the actual photograph. Alternately, the subject must be informed of the pre-flash, typically loosing any spontaneity of the subject captured in the photograph.

Those familiar with the art have developed complex analysis processes operating within a camera prior to invoking a pre-flash. Various conditions are monitored prior to the photograph before the pre-flash is generated, the conditions include the ambient light level and the distance of the subject from the camera. Such a system is described in U.S. Pat. No. 5,070,355 to Inoue et al. Although that invention minimizes the occurrences where a pre-flash is used, it does not eliminate the need for a pre-flash. What is needed is a method of eliminating the red-eye phenomenon with a miniature camera having an integral without the distraction of a pre-flash.

Digital cameras are becoming more popular and smaller in size. Digital cameras have several advantages over film cameras. Digital cameras eliminate the need for film as the image is digitally captured and stored in a memory array for display on a display screen on the camera itself. This allows photographs to be viewed and enjoyed virtually instantaneously as opposed to waiting for film processing. Furthermore, the digitally captured image may be downloaded to another display device such as a personal computer or color printer for further enhanced viewing. Digital cameras include microprocessors for image processing and compression and camera systems control. Nevertheless, without a pre-flash, both digital and film cameras can capture the red-eye phenomenon as the flash reflects within a subject's eye. Thus, what is needed is a method of eliminating red-eye phenomenon within a miniature digital camera having a flash without the distraction of a pre-flash.

DESCRIPTION OF A PREFERRED EMBODIMENT

Figure 1:
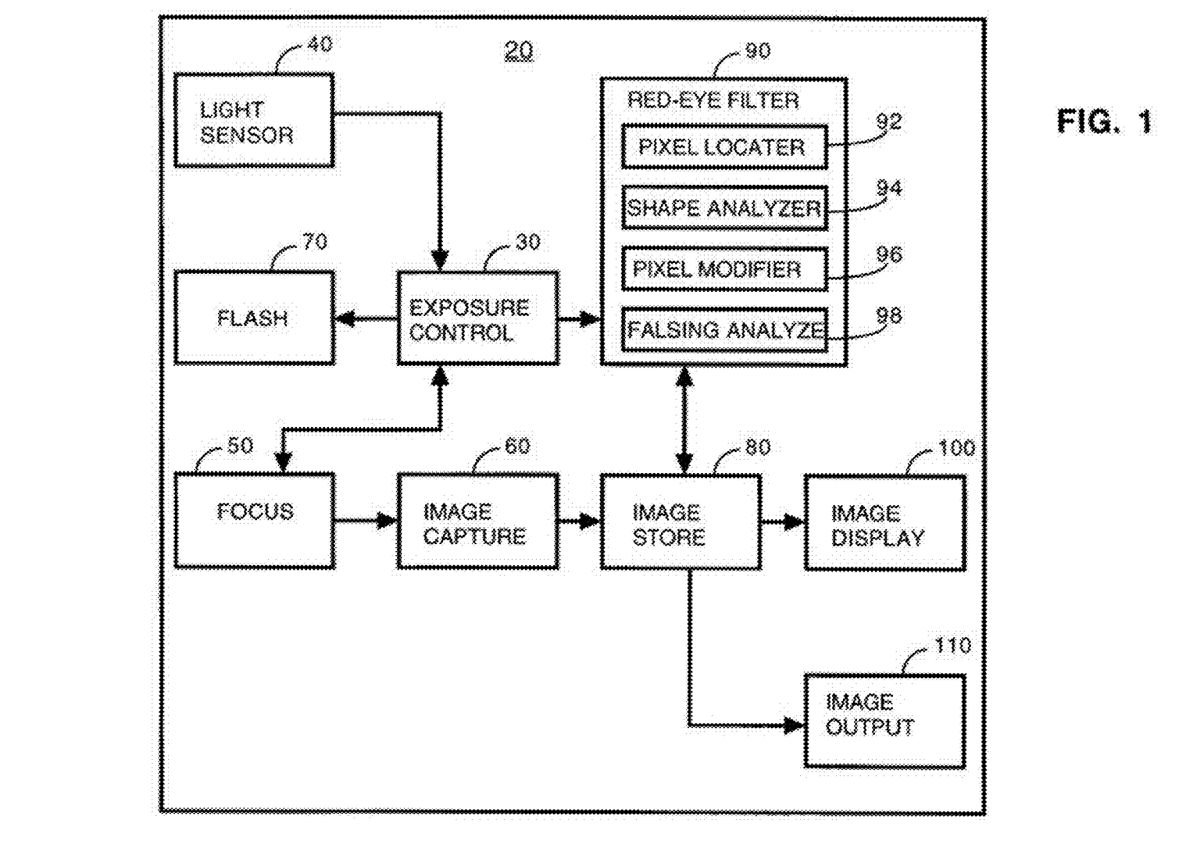
FIG. 1 shows a block diagram of a camera apparatus operating in accordance with the present invention.

FIG. 1 shows a block diagram of a camera apparatus operating in accordance with the present invention. The camera 20 includes an exposure control 30 that, in response to a user input, initiates and controls the digital photographic process. Ambient light is determined using light sensor 40 in order to automatically determine if a flash is to be used. The distance to the subject is determined using focusing means 50 which also focuses the image on image capture means 60. The image capture means digitally records the image in color. The image capture means is known to those familiar with the art and may include a CCD (charge coupled device) to facilitate digital recording. If a flash is to be used, exposure control means 30 causes the flash means 70 to generate a photographic flash in substantial coincidence with the recording of the image by image capture means 60. The flash may be selectively generated either in response to the light sensor 40 or a manual input from the user of the camera. The image recorded by image capture means 60 is stored in image store means 80 which may comprise computer memory such a dynamic random access memory or a nonvolatile memory. The red-eye filter 90 then analyzes the stored image for characteristics of red-eye, and if found, modifies the image and removes the red-eye phenomenon from the photograph as will be describe in more detail. The red-eye filter includes a pixel locator 92 for locating pixels having a color indicative of red-eye; a shape analyzer 94 for determining if a grouping of at least a portion of the pixels located by the pixel locator comprise a shape indicative of red-eye; a pixel modifier 96 for modifying the color of pixels within the grouping; and an falsing analyzer 98 for further processing the image around the grouping for details indicative of an image of an eye. The modified image may be either displayed on image display 100 or downloaded to another display device, such as a personal computer or printer via image output means 110. It can be appreciated that many of the processes implemented in the digital camera may be implemented in or controlled by software operating in a microcomputer (.mu.C) or digital signal processor (DSP) and/or an application specific integrated circuit (ASIC).

Figure 2:
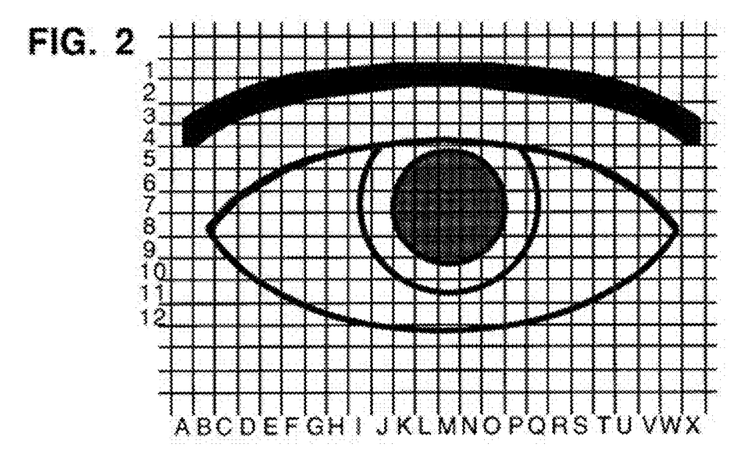
FIG. 2 shows a pixel grid upon which an image of an eye is focused.

FIG. 2 shows a pixel grid upon which an image of an eye is focused. Preferably the digital camera records an image comprising a grid of pixels at least 640 by 480. FIG. 2 shows a 24 by 12 pixel portion of the larger grid labeled columns A-X and rows 1-12 respectively.

Figure 3:
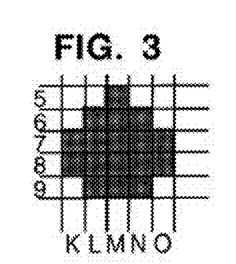
FIG. 3 shows pixel coordinates of the pupil of FIG. 2.

FIG. 3 shows pixel coordinates of the pupil of FIG. 2. The pupil is the darkened circular portion and substantially includes seventeen pixels: K7, K8, L6, L7, L8, L9, M5, M6, M7, M8, M9, N6, N7, N8, N9, O7 and O8, as indicated by shaded squares at the aforementioned coordinates. In a non-flash photograph, these pupil pixels would be substantially black in color. In a red-eye photograph, these pixels would be substantially red in color. It should be noted that the aforementioned pupil pixels have a shape indicative of the pupil of the subject, the shape preferably being a substantially circular, semi-circular or oval grouping of pixels. Locating a group of substantially red pixels forming a substantially circular or oval area is useful by the red-eye filter.

Figure 4:
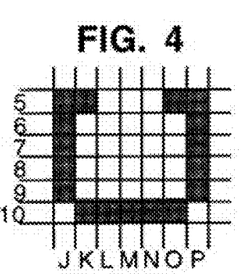
FIG. 4 shows pixel coordinates of the iris of FIG. 2.

FIG. 4 shows pixel coordinates of the iris of FIG. 2. The iris pixels are substantially adjacent to the pupil pixels of FIG. 2. Iris pixels J5, J6, J7, J8, J9, K5, K10, L10, M10, N1O, O5, O10, P5, P6, P7, P8 and P9 are indicated by shaded squares at the aforementioned coordinates. The iris pixels substantially surround the pupil pixels and may be used as further indicia of a pupil. In a typical subject, the iris pixels will have a substantially constant color. However, the color will vary as the natural color of the eyes each individual subject varies. The existence of iris pixels depends upon the size of the iris at the time of the photograph, if the pupil is very large then iris pixels may not be present.

Figure 5:
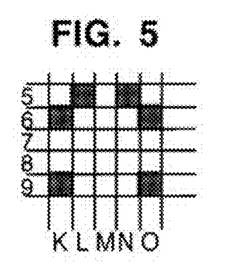
FIG. 5 shows pixel coordinates which contain a combination of iris and pupil colors of FIG. 2.

FIG. 5 shows pixel coordinates which include a combination of iris and pupil colors of FIG. 2. The pupil/iris pixels are located at K6, K9, L5, N5, O6, and O9, as indicated by shaded squares at the aforementioned coordinates. The pupil/iris pixels are adjacent to the pupil pixels, and also adjacent to any iris pixels which may be present. Pupil/iris pixels may also contain colors of other areas of the subject's eyes including skin tones and white areas of the eye.

Figure 6:
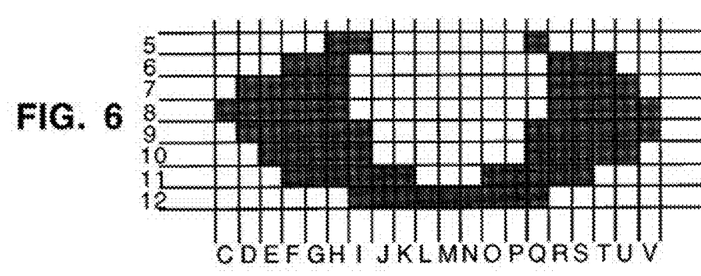
FIG. 6 shows pixel coordinates of the white eye area of FIG. 2.

FIG. 6 shows pixel coordinates of the white eye area of FIG. 2. The seventy one pixels are indicated by the shaded squares of FIG. 6 and are substantially white in color and are in the vicinity of and substantially surround the pupil pixels of FIG. 2.

Figure 7:
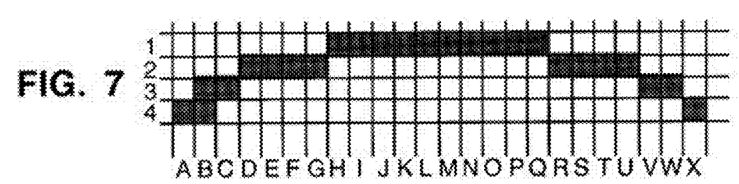
FIG. 7 shows pixel coordinates of the eyebrow area of FIG. 2.

FIG. 7 shows pixel coordinates of the eyebrow area of FIG. 2. The pixels are indicated by the shaded squares of FIG. 7 and are substantially white in color. The eyebrow pixels substantially form a continuous line in the vicinity of the pupil pixels. The color of the line will vary as the natural color of the eyebrow of each individual subject varies. Furthermore, some subjects may have no visible eyebrow at all.

It should be appreciated that the representations of FIG. 2 through FIG. 7 are particular to the example shown. The coordinates of pixels and actual number of pixels comprising the image of an eye will vary depending upon a number of variables. These variables include the location of the subject within the photograph, the distance between the subject and the camera, and the pixel density of the camera.

The red-eye filter 90 of FIG. 1 searches the digitally stored image for pixels having a substantially red color, then determines if the grouping has a round or oval characteristics, similar to the pixels of FIG. 3. If found, the color of the grouping is modified. In the preferred embodiment, the color is modified to black.

Searching for a circular or oval grouping helps eliminate falsely modifying red pixels which are not due to the red-eye phenomenon. In the example of FIG. 2, the red-eye phenomenon is found in a 5.times.5 grouping of pixels of FIG. 3. In other examples, the grouping may contain substantially more or less pixels depending upon the actual number of pixels comprising the image of an eye, but the color and shape of the grouping will be similar. Thus for example, a long line of red pixels will not be falsely modified because the shape is not substantially round or oval.

Additional tests may be used to avoid falsely modifying a round group of pixels having a color indicative of the red-eye phenomenon by further analysis of the pixels in the vicinity of the grouping. For example, in a red-eye phenomenon photograph, there will typically be no other pixels within the vicinity of a radius originating at the grouping having a similar red color because the pupil is surrounded by components of the subject's face, and the red-eye color is not normally found as a natural color on the face of the subject. Preferably the radius is large enough to analyze enough pixels to avoid falsing, yet small enough to exclude the other eye of the subject, which may also have the red-eye phenomenon. Preferably, the radius includes a range between two and five times the radius of the grouping. Other indicia of the recording may be used to validate the existence of red-eye including identification of iris pixels of FIG. 4 which surround the pupil pixels. The iris pixels will have a substantially common color, but the size and color of the iris will vary from subject to subject. Furthermore, the white area of the eye may be identified as a grouping of substantially white pixels in the vicinity of and substantially surrounding the pupil pixels as shown in FIG. 6. However, the location of the pupil within the opening of the eyelids is variable depending upon the orientation of the head of the subject at the time of the photograph. Consequently, identification of a number of substantially white pixels in the vicinity of the iris without a requirement of surrounding the grouping will further validate the identification of the red-eye phenomenon and prevent false modification of other red pixel groupings. The number of substantially white pixels is preferably between two and twenty times the number of pixels in the pupil grouping. As a further validation, the eyebrow pixels of FIG. 7 can be identified.

Further, additional criterion can be used to avoid falsely modifying a grouping of red pixels. The criterion include determining if the photographic conditions were indicative of the red-eye phenomenon. These include conditions known in the art including use of a flash, ambient light levels and distance of the subject. If the conditions indicate the red-eye phenomenon is not present, then red-eye filter 90 is not engaged.

FIG. 5 shows combination pupil/iris pixels which have color components of the red-eye phenomenon combined with color components of the iris or even the white area of the eye. The invention modifies these pixels by separating the color components associated with red-eye, modifying color of the separated color components and then adding back modified color to the pixel. Preferably the modified color is black. The result of modifying the red component with a black component makes for a more natural looking result. For example, if the iris is substantially green, a pupil/iris pixel will have components of red and green. The red-eye filter removes the red component and substitutes a black component, effectively resulting in a dark green pixel.

Figure 8:
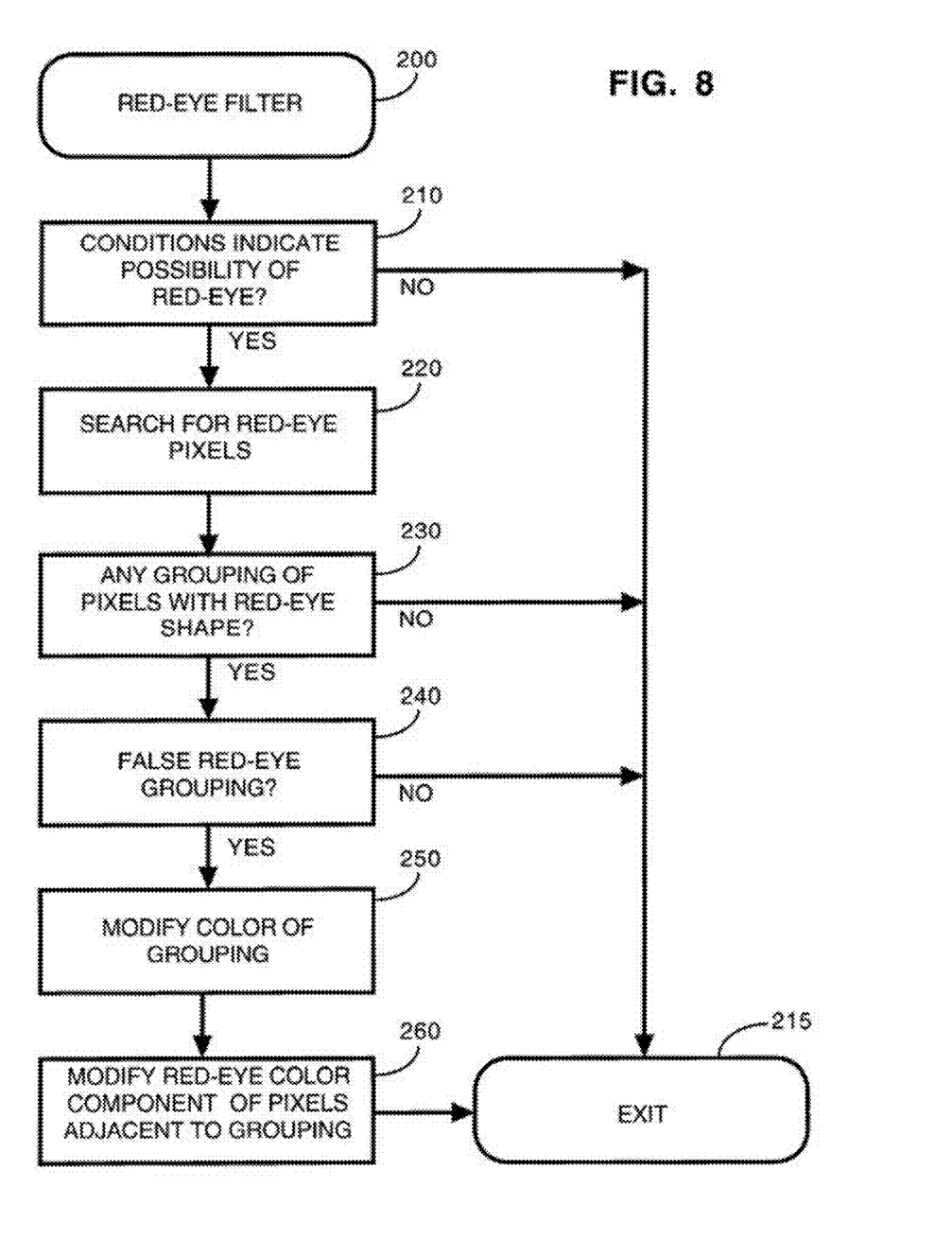
FIG. 8 shows a flow chart of a method operating in accordance with the present invention.

FIG. 8 shows a flow chart of a method operating in accordance with the present invention. The red-eye filter process is in addition to other processes known to those skilled in the art which operate within the camera. These other processes include flash control, focus, and image recording, storage and display. The red-eye filter process preferably operates within software within a .mu.C or DSP and processes an image stored in image store 80. The red-eye filter process is entered at step 200. At step 210 conditions are checked for the possibility of the red-eye phenomenon. These conditions are included in signals from exposure control means 30 which are communicated directly to the red-eye filter. Alternatively the exposure control means may store the signals along with the digital image in image store 80. If conditions do not indicate the possibility of red-eye at step 210, then the process exits at step 215. Step 210 is further detailed in FIG. 9, and is an optional step which may be bypassed in an alternate embodiment. Then is step 220 the digital image is searched of pixels having a color indicative of red-eye. The grouping of the red-eye pixels are then analyzed at step 230. Red-eye is determined if the shape of a grouping is indicative of the red-eye phenomenon. This step also accounts for multiple red-eye groupings in response to a subject having two red-eyes, or multiple subjects having red-eyes. If no groupings indicative of red-eye are found, then the process exits at step 215. Otherwise, false red-eye groupings are checked at optional step 240. Step 240 is further detailed in FIG. 10 and prevents the red-eye filter from falsely modifying red pixel groupings which do not have further indicia of the eye of a subject. After eliminating false groupings, if no grouping remain, the process exits at step 215. Otherwise step 250 modifies the color of the groupings which pass step 240, preferably substituting the color red for the color black within the grouping. Then in optional step 260, the pixels surrounding a red-eye grouping are analyzed for a red component. These are equivalent to the pixels of FIG. 5. The red component is substituted for black by the red-eye filter. The process then exits at step 215.

It should be appreciated that the pixel color modification can be stored directly in the image store by replacing red-eye pixels with pixels modified by the red-eye filter. Alternately the modified pixels can be stored as an overlay in the image store, thereby preserving the recorded image and only modifying the image when displayed in image display 100. Preferably the filtered image is communicated through image output means 110. Alternately the unfiltered image with the overlay may be communicated through image output means 110 to a external device such as a personal computer capable of processing such information.

Figure 9:
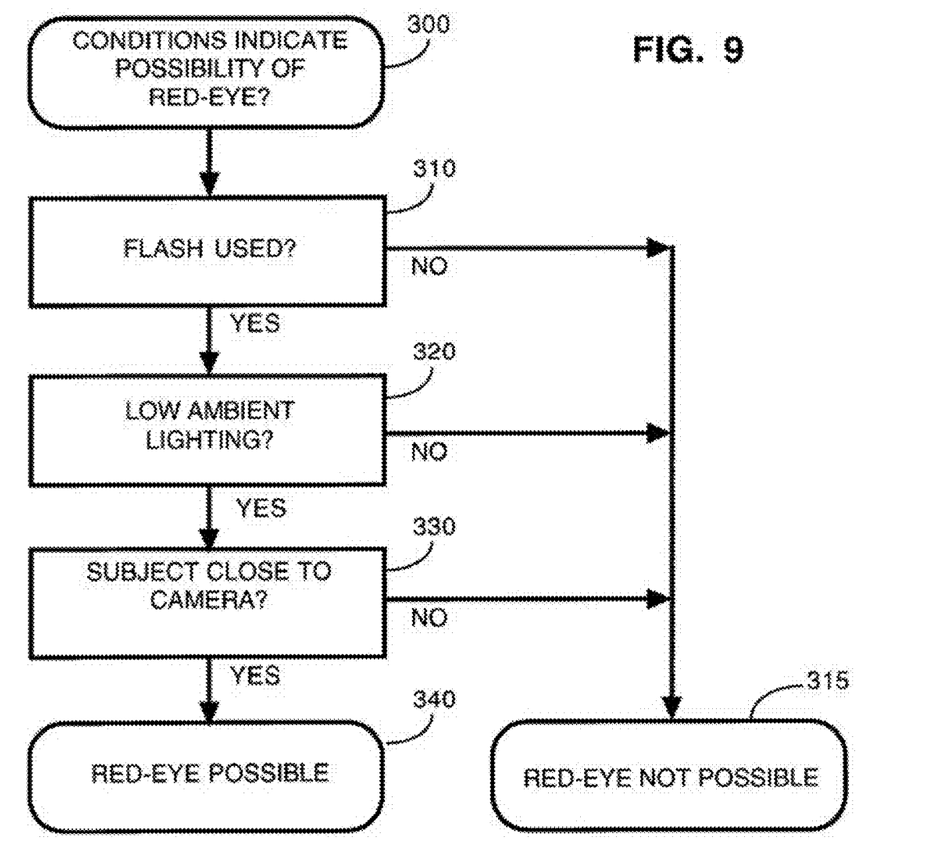
FIG. 9 shows a flow chart for testing if conditions indicate the possibility of a red-eye phenomenon photograph.

FIG. 9 shows a flow chart for testing if conditions indicate the possibility of a red-eye phenomenon corresponding to step 210 of FIG. 8. Entered at step 300, step 310 checks if a flash was used in the photograph. If not, step 315 indicates that red-eye is not possible. Otherwise optional step 320 checks if a low level of ambient light was present at the time of the photograph. If not, step 315 indicates that red-eye is not possible. Otherwise optional step 330 checks if the subject is relatively close to the camera at the time of the photograph. If not, step 215 indicates that red-eye is not possible. Otherwise step 340 indicates that red-eye is possible.

Figure 10:
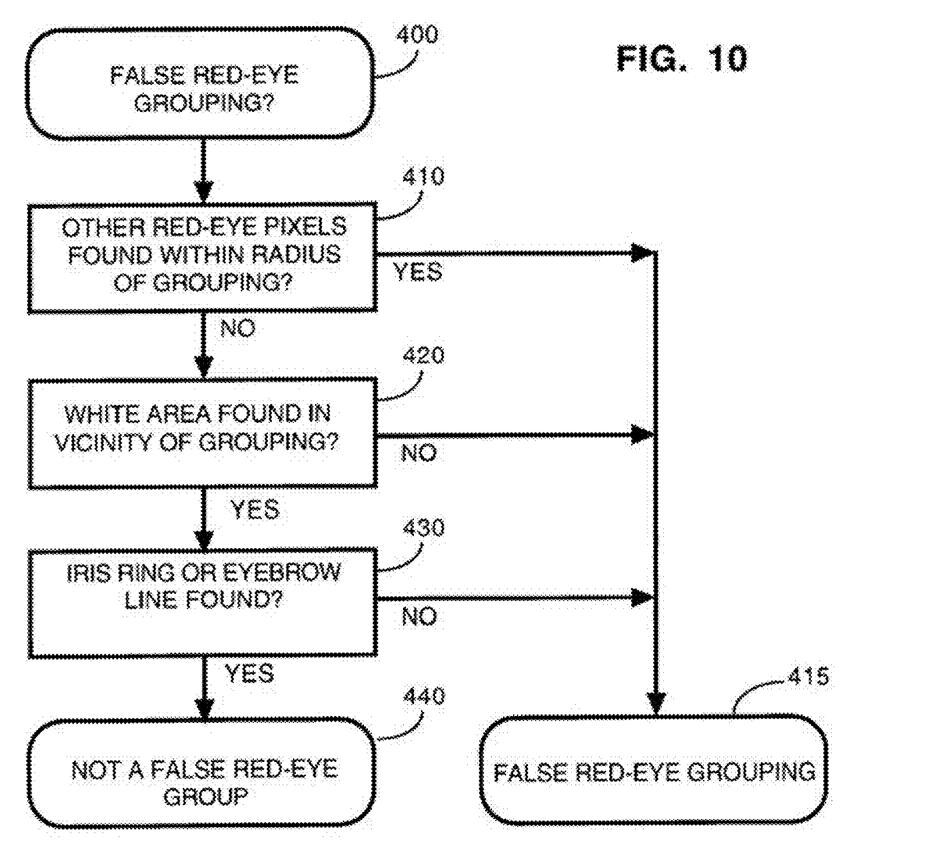
FIG. 10 shows a flow chart for testing if conditions indicate a false red-eye grouping.

FIG. 10 shows a flow chart for testing if conditions indicate a false red-eye grouping corresponding to step 240 of FIG. 8. Entered at step 400, step 410 checks if other red-eye pixels are found within a radius of a grouping. Preferably the radius is between two and five times the radius of the grouping. If found step 415 indicates a false red-eye grouping. Otherwise step 420 checks if a substantially white area of pixels is found in the vicinity of the grouping. This area is indicative of the white area of a subject's eye and has preferably between two and twenty times the number of pixels in the grouping. If not found step 415 indicates a false red-eye grouping. Otherwise step 430 searches the vicinity of the grouping for an iris ring or an eyebrow line. If not found, step 415 indicates a false red-eye grouping. Otherwise step 440 indicates the red-eye grouping is not false. It should be appreciated that each of the tests 410, 420 and 430 check for a false red-eye grouping. In alternate embodiments, other tests may be used to prevent false modification of the image, or the tests of FIG. 10 may be used either alone or in combination.

It should be further appreciated that either the red-eye condition test 210 or the red-eye falsing test 240 of FIG. 8 may be used to achieve satisfactory results. In an alternate embodiment test 240 may be acceptable enough to eliminate test 210, or visa versa. Alternately the selectivity of either the color and/or grouping analysis of the red-eye phenomenon may be sufficient to eliminate both tests 210 and 240 of FIG. 8. Furthermore, the color red as used herein means the range of colors and hues and brightnesses indicative of the red-eye phenomenon, and the color white as used herein means the range of colors and hues and brightnesses indicative of the white area of the human eye.

Thus, what has been provided is a method and apparatus for eliminating red-eye phenomenon within a miniature digital camera having a flash without the distraction of a pre-flash.

I claim:

1. A portable digital camera having no photographic film comprising:
    an integral flash for providing illumination during recording of an image without photographic film;
    a digital image capturing apparatus for recording said image; and
    a red-eye filter for modifying an area within said image indicative of a red-eye phenomenon and thereby generating a modified image that is stored on the camera as a modified image.

2. The camera according to claim 1, further comprising an integral image display for displaying the modified image.

3. The camera according to claim 1, wherein the area has a color and shape indicative of the red-eye phenomenon and the image is modified to change the color to a black color and further wherein:
    said integral flash selectively provides illumination during image recording; and
    said red-eye filter is enabled to modify the image in response to said integral flash providing illumination during image recording.

4. The camera according to claim 3 further comprising an exposure control means for determining if the image was recorded in a condition conducive to the red-eye phenomenon and for generating a red-eye signal in response thereto, wherein said red-eye filter is further enabled in response to the red-eye signal.

5. The camera according to claim 1, wherein said red-eye filter further includes a falsing avoidance apparatus which enables modification of the area in response to an absence of color indicative of the red-eye phenomenon with in a vicinity of and exclusive to the area.

6. The camera according to claim 1, wherein said red-eye filter further includes a falsing avoidance apparatus which enables modification of the area in response a substantially white colored region within a vicinity of the area.

7. The camera according to claim 1, wherein said red-eye filter comprises:
    a pixel locator for locating pixels having a color indicative of the red-eye phenomenon;
    a shape analyzer for determining if a grouping of at least a portion of the pixels located by said pixel locator comprise a shape indicative of the red-eye phenomenon; and a pixel modifier for modifying the color of the pixels within the grouping.

8. The camera according to claim 7, further comprising a falsing analyzer for further processing the image in a vicinity of the grouping for details indicative of an eye, and for enabling said pixel modifier in response thereto.

9. The camera according to claim 7, further comprising an exposure analyzer for determining if the image was recorded in a condition indicative of the red-eye phenomenon.

10. A portable digital camera having no photographic film comprising:
   an integral flash for providing illumination during recording of an image without photographic film;
   a digital image capturing apparatus for recording said image;
   a red-eye filter for modifying an area within said image indicative of a red-eye phenomenon and thereby generating a modified image; and
   an integral image display for displaying the modified image.

11. The camera according to claim 10, wherein the area has a color and shape indicative of the red-eye phenomenon and the image is modified to change the color to a black color and further wherein:
   said integral flash selectively provides illumination during image recording; and
   said red-eye filter is enabled to modify the image in response to said integral flash providing illumination during image recording.

12. The camera according to claim 11, further comprising an exposure control means for determining if the image was recorded in a condition conducive to the red-eye phenomenon and for generating a red-eye signal in response thereto, wherein said red-eye filter is further enabled in response to the red-eye signal.

13. The camera according to claim 10, wherein said red-eye filter further includes a falsing avoidance apparatus which enables modification of the area in response to an absence of color indicative of the red-eye phenomenon with in a vicinity of and exclusive to the area.

14. The camera according to claim 10, wherein said red-eye filter further includes a falsing avoidance apparatus which enables modification of the area in response a substantially white colored region within a vicinity of the area.

15. The camera according to claim 10, wherein said red-eye filter comprises:
   a pixel locator for locating pixels having a color indicative of the red-eye phenomenon;
   a shape analyzer for determining if a grouping of at least a portion of the pixels located by said pixel locator comprise a shape indicative of the red-eye phenomenon; and
   a pixel modifier for modifying the color of the pixels within the grouping.

16. The camera according to claim 15, further comprising a falsing analyzer for further processing the image in a vicinity of the grouping for details indicative of an eye, and for enabling said pixel modifier in response thereto.

17. The camera according to claim 15, further comprising an exposure analyzer for determining if the image was recorded in a condition indicative of the red-eye phenomenon.

18. A portable digital camera having no photographic film comprising:
   an integral flash for providing illumination during acquisition of an image without photographic film;
   a digital image capturing apparatus for acquiring said image; and
   a red-eye filter for modifying an area within said image indicative of a red-eye phenomenon.

19. The camera of claim 18, further comprising a processor and memory to generating and store on the camera a modified image including said image with said area modified.

20. The camera according to claim 18, further comprising an integral image display for displaying a modified image including said image with said area modified.

\* \* \* \* \*